US011074282B2

(12) United States Patent
Jagarlamudi et al.

(10) Patent No.: US 11,074,282 B2
(45) Date of Patent: Jul. 27, 2021

(54) SECURE BUBBLE CONTENT RECOMMENDATION BASED ON A CALENDAR INVITE

(71) Applicant: AirWatch, LLC, Atlanta, GA (US)

(72) Inventors: Anil Jagarlamudi, Alpharetta, GA (US); Suja Ramachandran, Atlanta, GA (US); Gaurav Arora, Alpharetta, GA (US); Naga Kaipu, Atlanta, GA (US); Karishma Babu, Dunwoody, GA (US)

(73) Assignee: Air Watch, LLC, Atlanta, GA (US)

( * ) Notice: Subject to any disclaimer, the term of this patent is extended or adjusted under 35 U.S.C. 154(b) by 668 days.

(21) Appl. No.: 14/963,380

(22) Filed: Dec. 9, 2015

(65) Prior Publication Data

US 2017/0083590 A1 Mar. 23, 2017

Related U.S. Application Data

(60) Provisional application No. 62/221,327, filed on Sep. 21, 2015.

(51) Int. Cl.
*G06F 16/33* (2019.01)
*G06F 16/335* (2019.01)
*G06Q 10/10* (2012.01)

(52) U.S. Cl.
CPC ......... *G06F 16/335* (2019.01); *G06Q 10/109* (2013.01)

(58) Field of Classification Search
CPC ........... G06F 17/3087; G06F 17/30867; G06F 17/30752; G06F 17/30056; G06F 17/30058; G06F 17/30241; G06F 17/30442; G06F 17/30699; G06F 17/30864; G06F 17/30964; G06F 16/24578; G06F 16/248; G06F 16/2455; G06F 16/24575; G06F 16/9024; G06F 16/285; G06F 16/334; G06F 16/90324; G06F 16/9537; G06F 17/218; G06F 16/245; G06F 16/25; G06F 16/288; G06F 16/3326; G06F 16/3331; G06F 16/35; G06F 16/353; G06F 16/487; G06F 16/637; G06F 16/683; G06F 16/7867; G06F 17/212; G06F 16/54; G06F 1/1641;
(Continued)

(56) References Cited

U.S. PATENT DOCUMENTS 9,182,788 B2 * 11/2015 Sirpal .................. G06F 1/1605
2004/0070627 A1 * 4/2004 Shahine .............. G06F 16/9038
715/794

(Continued)

*Primary Examiner* — Alford W Kindred
*Assistant Examiner* — Cecile H Vo
(74) *Attorney, Agent, or Firm* — Clayton, McKay & Bailey, PC

(57) ABSTRACT

Systems herein allow a user device to monitor calendar events with a secure bubble application. When an event is upcoming, the secure bubble application can present a notification. The secure bubble application can search other managed applications for content relevant to the meeting event. The secure bubble application can extract text, tags, and other metadata from the calendar event and any attached files. The text, tags, and other metadata can be used to search each managed application. Relevant emails, files, and notes can be displayed in a card generated by the secure bubble application.

20 Claims, 12 Drawing Sheets

(58) Field of Classification Search
CPC ...... G06F 1/1647; G06F 1/1677; G06F 16/48; G06F 16/335; G06F 16/9038; G06Q 10/109
USPC .......... 707/736, E17.014, E17.009, E17.044, 707/E17.058, E17.089, 752, 758, 999.107, 707/202, 728; 715/202
See application file for complete search history.

(56) References Cited

U.S. PATENT DOCUMENTS

| | | | |
|---|---|---|---|
| 2010/0162105 A1* | 6/2010 | Beebe | G06Q 10/109 715/273 |
| 2014/0208095 A1* | 7/2014 | Stuntebeck | H04L 63/105 713/152 |
| 2014/0280602 A1* | 9/2014 | Quatrano | H04L 67/02 709/205 |
| 2015/0088927 A1* | 3/2015 | Sarrazin | G06F 16/148 707/769 |
| 2016/0246784 A1* | 8/2016 | Chakerian | G06F 16/86 |
| 2017/0118259 A1* | 4/2017 | Wadhwa | G06F 3/04842 |

\* cited by examiner

336 — SALES DEMO MEETING IN 5 MINUTES

PAST MEETING NOTES

THERESA   WALTER   GERALD   MADISON   MORE

350 —

ACTION ITEMS:

• SET UP FOLLOW UP MEETING WITH DEVELOPMENT

• INFORM MARKETING OF IMPENDING CHANGES

• CLARIFY WITH JOHN AND JIM REGARDING CHANGES BEFORE NOTIFYING MARKETING

• PREAPRE FOR 3.0 BETA RELEASE READINESS

• CONTACT TECHINICAL WRITING ABOUT DOCUMENTATION CHANGES

RELATED EMAILS

360 —

RONALD LEVICK — 12:30 PM
MARKETING NUMBERS
HI MARIA, I HAVE ATTACHED QUARTERLY NUMBERS FOR MARK...

VINCENT FERNANDEZ — 4:30 PM

*FIG. 3G*

SECURE BUBBLE CONTENT RECOMMENDATION BASED ON A CALENDAR INVITE

CROSS REFERENCE TO RELATED APPLICATION

This application claims priority to provisional patent application No. 62/221,327 ("Secure Bubble Content Recommendation Based on a Calendar Invite"), filed Sep. 21, 2015, which is incorporated by reference in its entirety.

BACKGROUND

Users in an enterprise environment and elsewhere commonly hold teleconferences and online meetings with other users. These are typically scheduled in advance by a calendar invitation sent by email to invited participants.

In preparing for a scheduled meeting, users must familiarize themselves with meeting topics. This can include locating and reviewing relevant content. Current technology offers little assistance to the user in this regard. Instead, the user typically opens a calendar invite to obtain any attachments or other text provided in the invitation. However, the calendar invite often does not contain all relevant contextual information. Current technology does not provide additional context to the user or otherwise assist the user in locating helpful content.

Additionally, manually searching for relevant content items can be difficult on a mobile user device. Screen space can be limited, so opening multiple applications to search for relevant content items can be cumbersome. Even if a user locates one content item, such as an email or a document, they may need to navigate away to find a second content item. The first content item might no longer be easily retrievable once the user switches to a second content item. Located items also cannot be conveniently displayed together. Additionally, if the user takes notes on the user device during the meeting, it can be difficult to retrieve documents they previously located. Consequently, participating in the meeting from a mobile user device can involve cumbersome workflow when document retrieval is involved.

For at least these reasons, a need exists for systems for improved content recommendation based on a calendar invite.

SUMMARY

It is to be understood that both the foregoing general description and the following detailed description are exemplary and explanatory only and are not restrictive of the examples, as claimed.

In one example, a system dynamically recommends content based on information in a calendar event, such as a meeting invite. The system can include a user device, such as a phone or tablet, with a memory and processor that executes one or more applications. The system can gather tag information from the invitation, including from documents that are attached to the invitation. Tag information can include metadata that identifies features of various types of content items. Tags can be applied to documents when they are created or edited, and can be used to gather relevant information about the content item.

Using the gathered tag information, the system can initiate a first email search, including supplying at least a first subset of the tag information as a first search criteria to an email application. The system can also similarly initiate a first document search, including supplying at least a second subset of the tag information as a second search criteria to a content storage application.

Using a multiple cards for different document types, at least a subset of the results from the email and document searches can be prioritized and displayed. A first card can be dedicated to email search results, and can include an ordered listing of emails identified in the first email search. The order can be determined by which emails best matched the tag information search criteria, among other factors. A second card can be dedicated to a different non-email document type, and include an ordered listing of documents identified in the first document search.

In one example, a third card is dedicated to a notes document type. It can display notes from prior related meetings. The system can determine that the notes are related to a meeting based, for example, on matching a calendar event identifier for a recurring meeting to tag information in the notes.

In another example, a user can select a content item in the first or second card. This can indicate that the user finds the content item to be relevant. Based on information from the selected content item, the system can initiate an additional search for additional content items that match at least some of the information in the selected content item. Then, the system can display at least one additional content item from the additional search. The additional content item can be displayed in a new card in one example.

The system can allow the user to select or eliminate content items or entire cards. When the user makes a selection or elimination, the system can dynamically search for more content items based on the selection and elimination, displaying the most relevant results. The user can continue selecting and eliminating content items until the user is satisfied with one or more cards of relevant content items. A system employing this dynamic search process can save a user valuable time in preparing for a meeting compared to existing document location technologies. This is especially true when the user is using a mobile device such as a phone or tablet.

BRIEF DESCRIPTION OF THE DRAWINGS

FIG. 3G is an exemplary illustration of a graphical user interface provided by the secure bubble content application.

DESCRIPTION OF THE EXAMPLES

Reference will now be made in detail to the present examples, including examples illustrated in the accompany- Examples described herein include systems for secure bubble content recommendation. A secure bubble application can be a managed application that executes persistently on a user device, making content recommendations based on calendar events. When a calendar event is upcoming, the secure bubble application can display a notification on the user device. When the user selects the notification, a card can be displayed with relevant information about the meeting. The terms "card" and "pane" are used interchangeably. The user can select an option to retrieve relevant content for the meeting, such as emails, documents, or notes. The secure bubble application can then cause other managed applications to search for relevant content based on metadata commonalities between the meeting invitation and existing content. The retrieved content can be scored and ranked, and the most relevant content can be displayed on a card to the user. This allows a user attempting to quickly prepare for a meeting to have all of the relevant information from multiple sources, including documents, e-mail, and prior notes, to be surfaced to aid in preparation for the meeting. This avoids a user having to manually open and search for content from a plurality of applications prior to or during a meeting.

Based on user interactions with the card and recommended content items, the secure bubble application can perform additional searches for relevant content. For example, if the user selects an attendee that is on the meeting invite, the secure bubble application can cause an email application to search for and prioritize email correspondence between the user and the attendee. If the user selects a document, then the secure bubble application can search for emails related to the document. Selected items can remain on the content list, with related content items further populating the content list or populating a separate card. Alternatively, if one of the displayed content items is not useful to the user, the user can swipe it off of the content list. The secure bubble application can replace the removed content item with a content item with a next-highest relevance rating.

This can allow a user to quickly view a list of content items related to a meeting. Because the content items can be persistent on the card, the user can easily switch between content items during the meeting. The user can also switch between cards that are organized by document type, and eliminate cards that the user does not find useful. This can provide improved workflow to a user participating in a meeting using a mobile user device.

Figure 1:
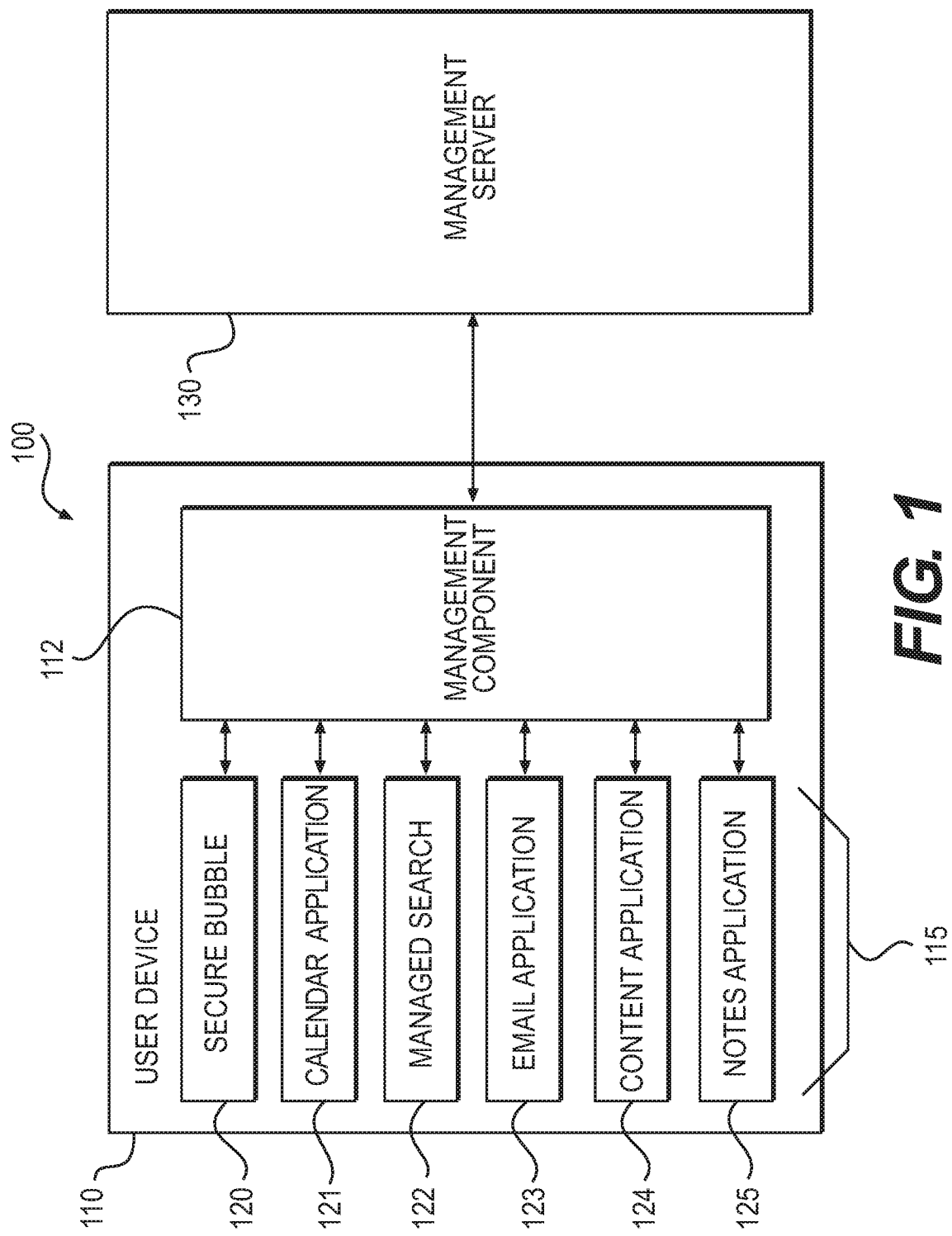
FIG. 1 is an exemplary illustration of system components.

FIG. 1 illustrates an exemplary system 100 for secure bubble content recommendation. A user device 110 can be any computing device, such as a cell phone, laptop, tablet, personal computer, or workstation. A user device 110 can include a non-transitory computer-readable medium containing instructions that are executed by a processor. Example non-transitory, computer-readable mediums include RAM and ROM, disks, and other memory and storage that is accessible by a USB port, a floppy drive, CD-ROM, or DVD-ROM drive, and a flash drive, among others.

The user device 110 can execute managed applications 115 with functionality that can be controlled by a management server 130. The management server 130 can control the managed applications 115 through interaction with a management component 112 that can execute on the user device 110. Managed applications 115 can allow a user to communicate on an enterprise network with the management server 130 to securely access files. This can allow a user to use their own user device 110, such as a cell phone, in a work environment while limiting access to work files (e.g., by providing file access only to the managed applications). The user device 110 can communicate with the management server 130 over the network using one or more modulators, demodulators, multiplexers, demultiplexers, network communication devices, wireless devices, antennas, modems, and any other type of device configured to enable data communication through a communication network.

The management component 112 can include a device-level component, such as an application programming interface (an "API"), agent application, hypervisor, or virtualized device, and an application-level component, such as an API, SDK, application wrapper, or workspace agent application). The device-level management component can include system level privileges. The application-level management component can include privileges in managed applications 115, which can be developed for operation with the management server 130. Reference to the management component 112 is understood to include either or both of the device-level and application-level components unless otherwise specified.

The management server 130 can interact with the management component 112 with calls to an application (e.g., application level) or the operating system (e.g., device level) of a user device 110. In one example, based on a permissions control, the management server 130 can turn functionality on and off within the managed applications 115 through calling subroutines in the management component 112. If a permission control specifies it, the management server 130 can turn off functionality at the user device 110, such as printing, emailing, or Internet access. This can allow for added security when viewing or editing particularly sensitive document portions.

In addition, the management server 130 can utilize the management component 112 to uninstall the secure bubble application 120. This can be done, for example, if the user device 110 is lost or if an employee leaves the job.

In one example, a secure bubble application 120 can execute on the user device 110. The secure bubble application 120 can be a managed application 115 that is installed on the user device 110 from the management server 130, such as through communications with the management component 112. The secure bubble application 120 can run persistently on the user device 110, periodically checking for upcoming or present calendar events. The user's calendar can be maintained in another managed application 115, such as a calendar application 121. Because the calendar application 121 is also managed, the secure bubble application 120 can be implemented to communicate with the calendar application 121. Alternatively, the secure bubble application 120 can request calendar event information from the management server 130 through the management component 112.

When a calendar event approaches or occurs, the secure bubble application 120 can notify the user by displaying a notification, such as a notification bar, an icon, or icon with a badge indicating the number of upcoming calendar events. The notification can be displayed at a threshold time before or at the start time of the calendar event. The notification can be placed on a top display layer so that it is visible and selectable even when another graphical user interface ("GUI") is being displayed. This can ensure that the user is notified of the upcoming calendar event. It can also allow the user to easily activate, for example by tapping or clicking, the notification to receive further context about the meeting.

The user can select the notification to reveal relevant context around the calendar event. The secure bubble application 120 can determine and retrieve content relevant to the meeting event from the other managed applications 115. In one example, the secure bubble application 120 can utilize a managed search application 122, which is designed to search for content in the other managed applications 115. The managed search application 122 can search text, metadata, and tags for content generated or stored in other managed applications 115 through use of the management component 112, as further described below.

Although an example has been described where the managed search application 122 and other applications 115 are managed, the applications can also be unmanaged applications. In addition, the management component 112 and management server 130 need not be provided in all examples. For example, the applications executing on the device can be developed using a software development kit, API, or wrapped to provide the described search functionality. In this way, the secure bubble application 120 can provide search terms to a variety of different applications, and the applications can return relevant results that can be displayed in an organized fashion for a user.

Figure 2:
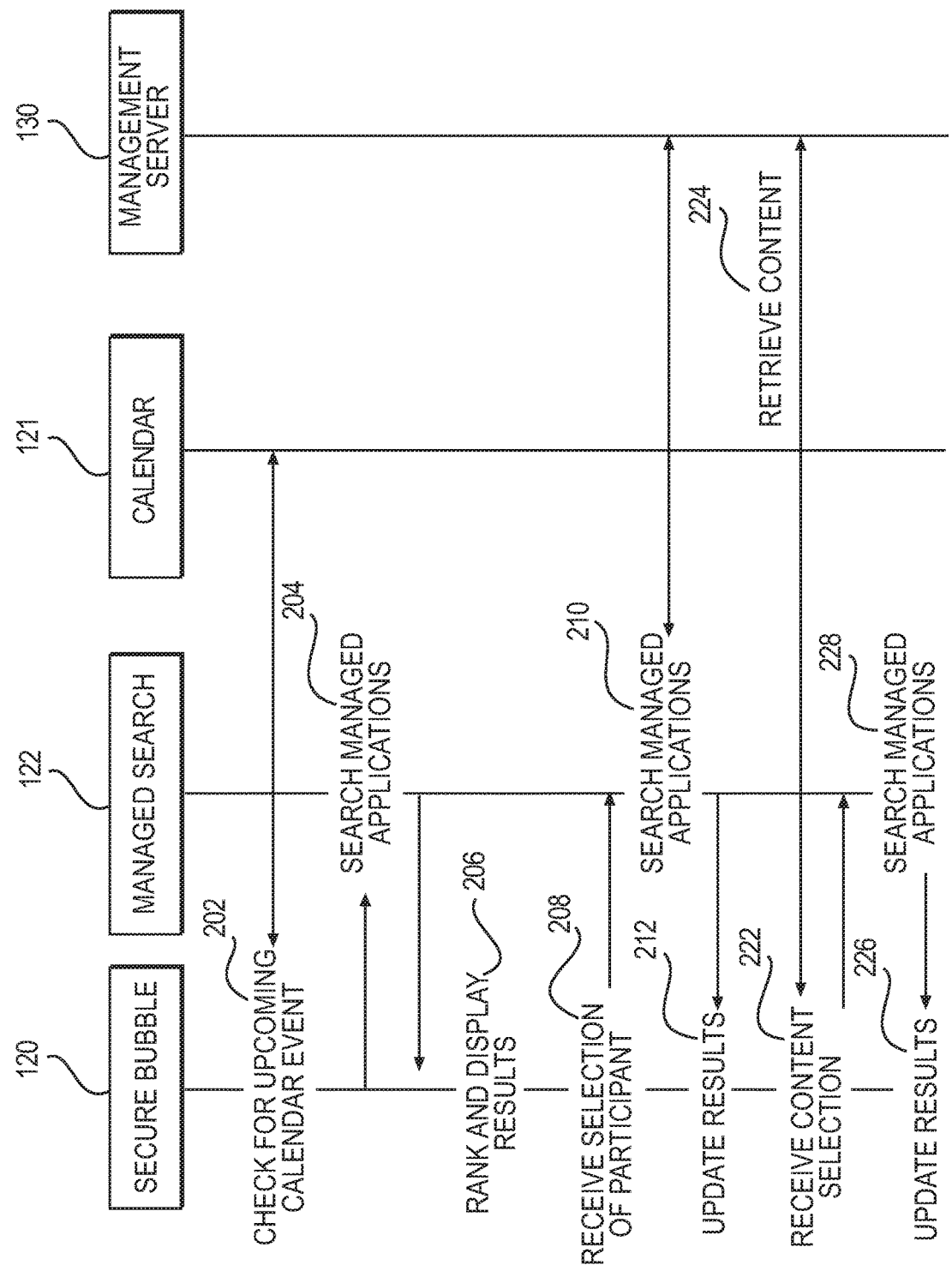
FIG. 2 is an exemplary method executed in a system.

FIG. 2 is an exemplary method executed in a system. At stage 202, the secure bubble application 120 can check for an upcoming calendar event. In one example, this can include communicating with the calendar application 121 through the management component 112. In another example, the management component 112 or management server 130 can notify the secure bubble application 120 of the upcoming calendar event.

Upon determining an upcoming calendar event exists, the secure bubble application 120 can cause the user device 110 to display a notification to notify the user of the upcoming calendar event.

At stage 204, the secure bubble application 120 can cause the managed search application 122 to search other managed applications 115 for content relevant to the calendar event. The secure bubble application 120 can initiate the search in response to the user selecting an option to retrieve relevant emails and files in one example. The search can be performed by the managed search application 122 or the various applications themselves, such as e-mail application 123, content application 124, and notes application 125, in examples.

In one example, the search is performed locally on the user device 110. The user device 110 can locally store metadata for emails, documents, notes, and other content, even when the corresponding content is stored remotely on or at the direction of the management server 130. In another example, further content is searched at the management server 130.

In one example, the managed search application 122 can compare tags from the calendar event to tags on content stored by the other managed applications 115. Tags from the calendar event can coincide with the calendar event information. For example, various tags can represent the sender, the recipients, and the location of the meeting. Additional tags can be gathered from any attachments to the corresponding meeting invite.

The management server 130 and management component 112 can implement a coordinated tagging system to facilitate tag-based content searching. The management component 112 or management server 130 can automatically determine and apply tags for different documents, such as emails, word processing documents, drawings, and notes. Example tags can include document authors, senders, recipients, and editors. Other tags can include a title, keywords, a location, or a date. Tags can be assigned to link common documents or recurring meetings. For example, different document versions can include a common document tag. Recurring or rescheduled meetings can include a common meeting tag. Emails that are part of a thread can similarly include a common tag. In this way, a single content item or meeting event can include many tags.

The managed search application 122 can provide some or all of the tags gathered from the meeting event and attached files (e.g., content items) as search inputs to each managed application 115. For example, the management component 112 can include a search interface for the email application 123. The email application 123 can match the tags against tags that have been previously generated for each email. The email application 123 can also eliminate duplicate results by returning the most recent email in an email thread before a threshold search date.

Similarly, the management component 112 can interface with the content application 124, causing the content application 124 to search for matching content items. The content application 124 can be used to retrieve enterprise documents stored at a location specified by the management server 130. The content application 124 can match search parameter tags against tags in the metadata of each document. The management component 112 can similarly interface with other managed applications 115, such as notes application 125, which can search for relevant documents or content items.

Based on the searches, the managed applications 115 can return one or more sets of content items, such as emails, files, and notes. In one example, the managed applications 115 or secure bubble application 120 can limit results to those content items that exceed a threshold number or percentage of tag matches in one example.

At stage 206, the search results can be ranked or prioritized, and displayed. The results further can be ordered based on percentage of tag matches and other weighting factors. Additional weighting factors can include length of an email thread. For example, longer emails can be prioritized first since a longer email chain can indicate importance. More recent emails can also be weighted for higher priority, to ensure that a recent email takes precedent over an older email in the same email chain.

As another example, when a meeting is related or recurring, relevant documents from the prior meeting can be prioritized higher. The documents can be tagged based on which ones were included as part of the prior meeting. In a subsequent meeting, those documents can be rated highly so that they are likely to appear towards the top of a recommended content list.

Weighting can be further assisted by permissions group information stored at the management server 130. For example, a content item associated with a permissions group to which the participants of a meeting belong can be positively weighted. Additionally, if a relevant content item is associated with a user that belongs to a high-level permissions group, such as an executive group, that content item can be more highly weighted.

The displayed prioritized results can include a subset of the overall results. In one example, only the top four emails can be displayed to save room on the GUI. A user can swipe away content items, allowing additional results to be displayed on the GUI in place of the swiped-away content items. In another example, weighting of the search results can take into account a user's swiping away of one or more content items. The search results can then be reprioritized based on the user's input or indication that one or more content items are not important.

The displayed list of prioritized content items can be modified by a user and dynamically supplemented in one example. This can be based on the user's selection of a particular content item or meeting participant, which can cause additional related content items to be retrieved.

For example, at stage 208, the secure bubble application 120 can detect user selection of a participant. Based on the selection, the secure bubble application 120 can cause the managed search application 122 to perform an additional search at stage 210 with emphasis on the selected participant(s). This additional search can return emails or documents involving the selected participant(s). For example, the search criteria can require a tag associated with the user to be present on the documents or emails. The additional search can be a local search in one example by providing the additional contextual information (e.g., the participant) as search criteria to the other applications. Alternatively, the user device 110 can contact the management server 130 to request a search at the management server 130, as illustrated in FIG. 2.

As another example, the user can select a content item at stage 222, which can cause the managed search 122 to perform an additional search within the other managed applications 115 with emphasis on the selected content item at stage 228. The search can return emails or notes involving the content item. Alternatively, it can return alternate versions of the content item.

The results of the additional e-mail or content searches can be displayed in new cards. The user can swipe to remove any card from the display that is no longer needed. Accordingly, as a user selects various items throughout the displayed cards, additional searches can be performed based on contextual information associated with the selected item, and the results of the additional searches can be shown in new cards in an ordered fashion. For example, assume a user opens a calendar notification and selects to show relevant e-mail and relevant content. The initial searches for e-mails and content relating to the meeting can be based on, for example, the other attendees, the name of the meeting, attachments to the meeting, reoccurrence of the meeting, and other criteria. The results can be shown in a related e-mail card and a related content card. Then, a user can select a particular one of the e-mails from the e-mail card, which can indicate that the user finds the particular e-mail to be relevant. This can cause an additional search to be performed based on the details of that e-mail, such as the subject, the sender, and the time of the e-mail. A new card can be presented to the user with an ordered list of e-mails relevant to the selected e-mail. A similar search process can occur when a user selects a particular content item, prior meeting notes, or other content.

Selecting a content item at stage 222 can also cause the user device 110 to contact the management server 130 to retrieve the content item, such as a document or email, at stage 224. Whereas search metadata identifying the content item can exist locally on the user device 110, the full document can be stored remotely by the management server 130 or locally on the user device 110. When the documents are stored remotely, the relevant content items can be downloaded to the user device 110 from the management server 130.

Once the search results are returned, the secure bubble application 120 can update the relevant content items at stages 212 and 226. This can include displaying a new card or supplementing the existing list(s) of relevant content. Each application can rank the search results to be returned and provide them in an ordered list to the secure bubble application 120 or managed search application 122. In other examples, the applications can return search results to managed search application 122 or secure bubble application 120, and the managed search application 122 or secure bubble application 120 can determine an order for displaying the search results. Additionally, a user can eliminate results that are not relevant by swiping them off the card in one example. Swiping away a content item can cause the secure bubble application 120 to display a next relevant content item.

By selecting content items and participants, and swiping away results that the user does not need, the user can quickly and conveniently build a list of content needed for the meeting. The user can select any of those content items to retrieve and view the content item. And by doing so, more relevant content can appear.

Similarly, the secure bubble application 120 can allow a user to take notes in connection with the meeting event. Those notes can be tagged by the management component 112 as related to the meeting event. When a future related meeting occurs, such as in the case of a recurring meeting, the secure bubble application 120 can include the notes as a relevant content item based on matching the tag. This can include searching a notes application 125 in one example.

Figure 3A:
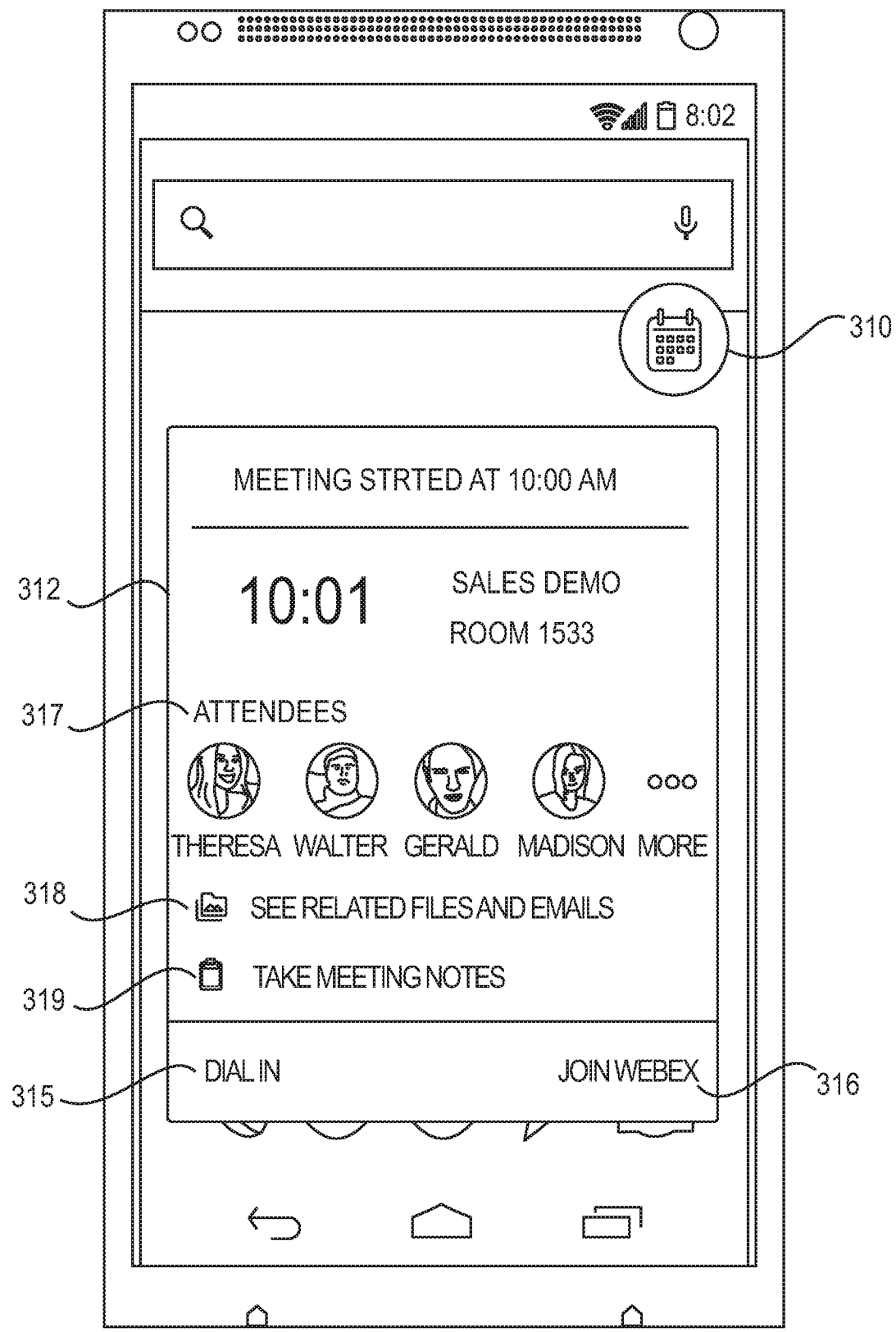
FIG. 3A is an exemplary illustration of a graphical user interface provided by the secure bubble content application.

FIGS. 3A-3G are exemplary illustrations of graphical user interfaces provided by the secure bubble application 120. Turning to FIG. 3A, when the secure bubble application 120 detects an upcoming or ongoing calendar event, it can display a notification 310, which in this example takes the form of an icon. The notification 310 can be displayed in front of existing graphics on the user device 110.

When the user activates the notification 310, the secure bubble application 120 can display a bubble card 312 that displays calendar event information for the upcoming or ongoing calendar event. The secure bubble application 120 can receive the calendar event information from the calendar application 121 or management server 130. The calendar event information can include attendees 317 (e.g., names and email addresses), start date and time, location, subject content, body content, and attachments. Images for the attendees can be retrieved from a server and automatically populated, as shown in FIG. 3A.

The bubble card 312 can include a first option 315 to dial into the meeting and a second option 316 to join the meeting online. Selecting the first option 315 can cause a phone application to activate (in a separate card) and dial into the meeting. The relevant phone number and optionally a meeting number and participant code can be automatically retrieved from the calendar invite and provided to the phone application for automatic dialing without further user interaction. Selecting the second option 316 can cause the online meeting to launch in a browser application or other specialized meeting application. The user can navigate between cards in an example, such as is shown in FIG. 3D. The options to dial in 315 and join an online meeting 316 can be grayed out or otherwise unselectable up until a predetermined amount of time prior to a meeting, such as five minutes. Once a user can join the meeting, the options 315 and 316 can become selectable and change color to indicate to a user that the meeting can be joined.

The bubble card 312 can also include a content recommendation option 318 and a notes option 319. Selecting the content recommendation option 318 can cause the secure bubble application 120 to search across the managed applications 115 as described above.

In one example, different content types are presented in different lists. For example, email, work files, and notes can be presented separately. This can allow the user to find the most relevant content items for each type of content.

Figure 3B:
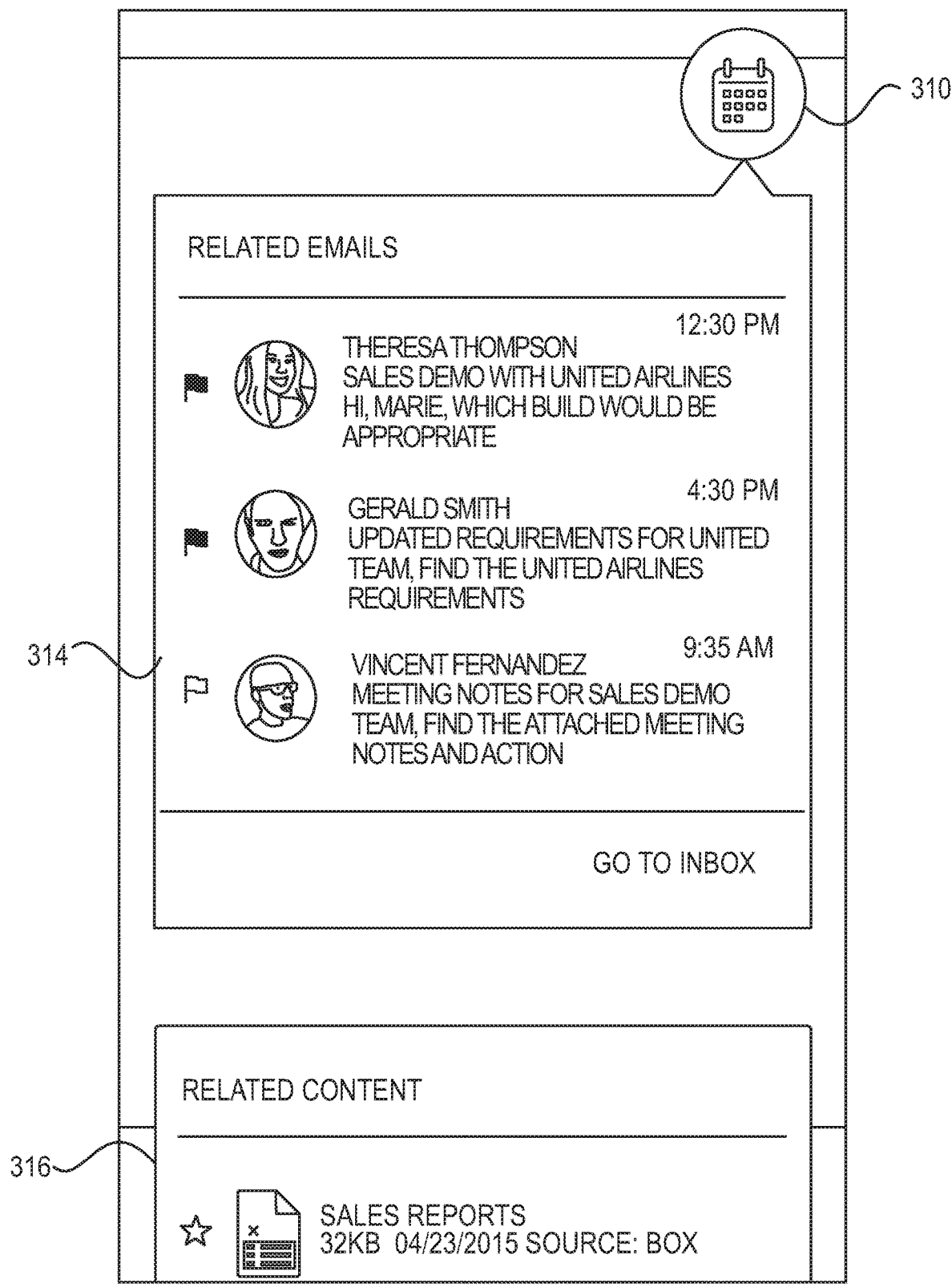
FIG. 3B is an exemplary illustration of a graphical user interface provided by the secure bubble content application.
Figure 3C:
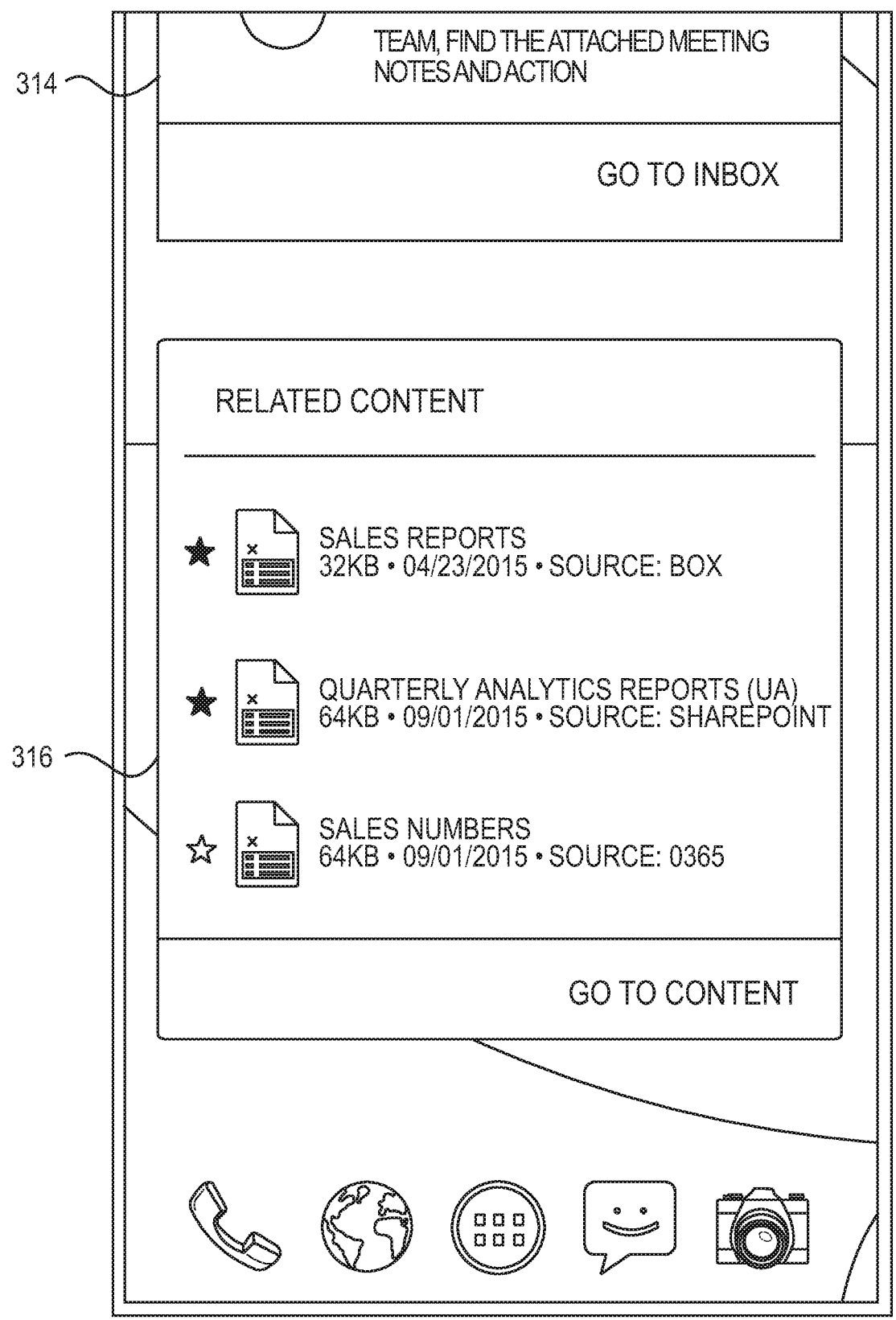
FIG. 3C is an exemplary illustration of a graphical user interface provided by the secure bubble content application.
Figure 3D:
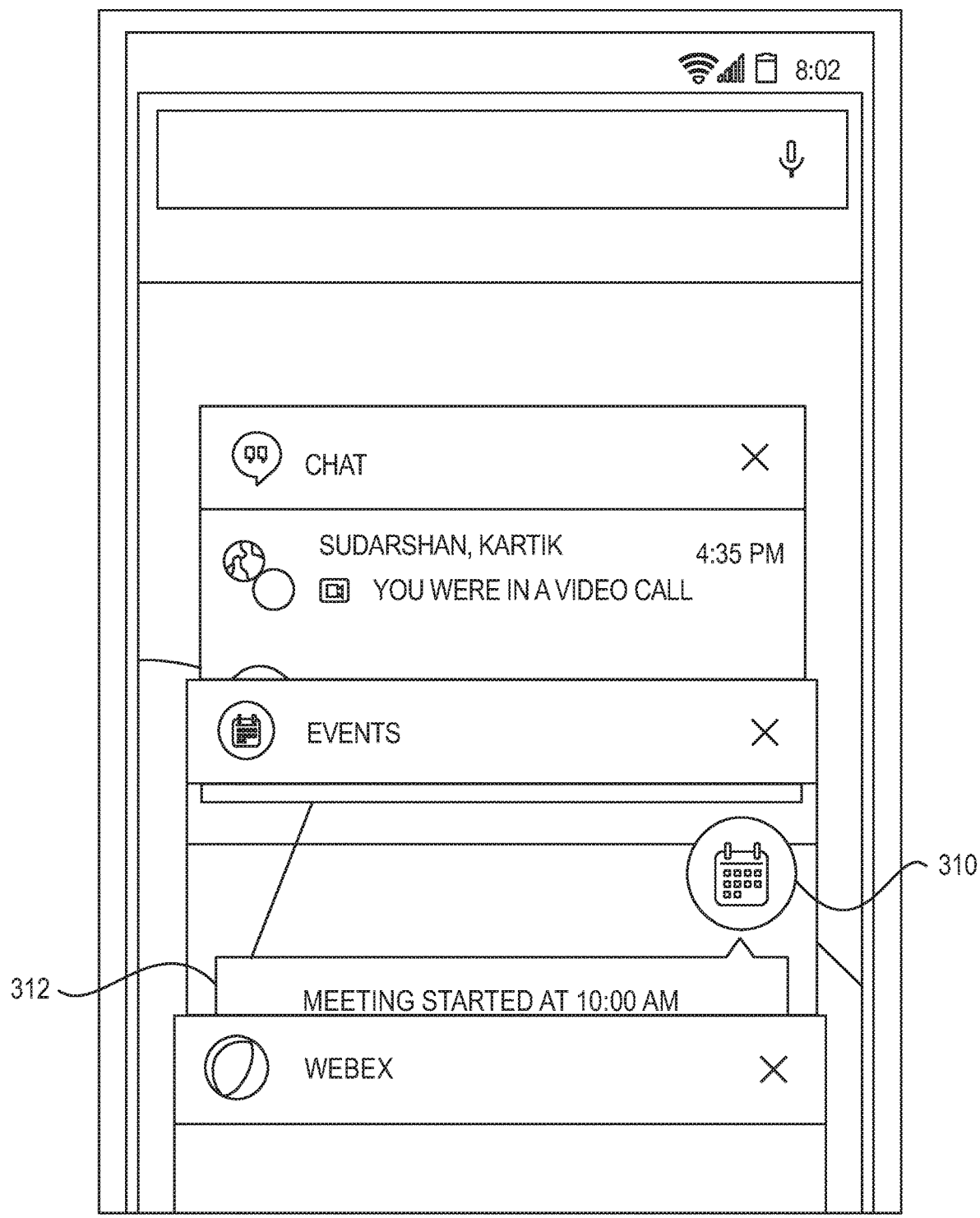
FIG. 3D is an exemplary illustration of a graphical user interface provided by the secure bubble content application.

Turning to FIGS. 3B and 3C, related email content is presented in pane 314 and related content, such as documents or videos, is presented in pane 316. Thus, the panes 314 and 316 are cards that include different content types compared to one another. The user can select a content item in either pane 314 and 316, which can cause the user device 110 to open the content item and perform an additional search based on the selected content item. This can result in the addition of new relevant content to the panes 314 and 316. The user can also select to go to their inbox from the related e-mail pane 314 to view other e-mails that might be relevant for the upcoming meeting. Similarly, a user can select to go to additional content as shown in the related content pane 316.

The bubble card 312 can also include an option to take notes 319, as shown in FIG. 3A. Selecting the option can launch a managed word processing application in one example. The management component 112 can apply a tag to the notes document that links it to the ongoing meeting or series of meetings in an example.

Figure 3E:
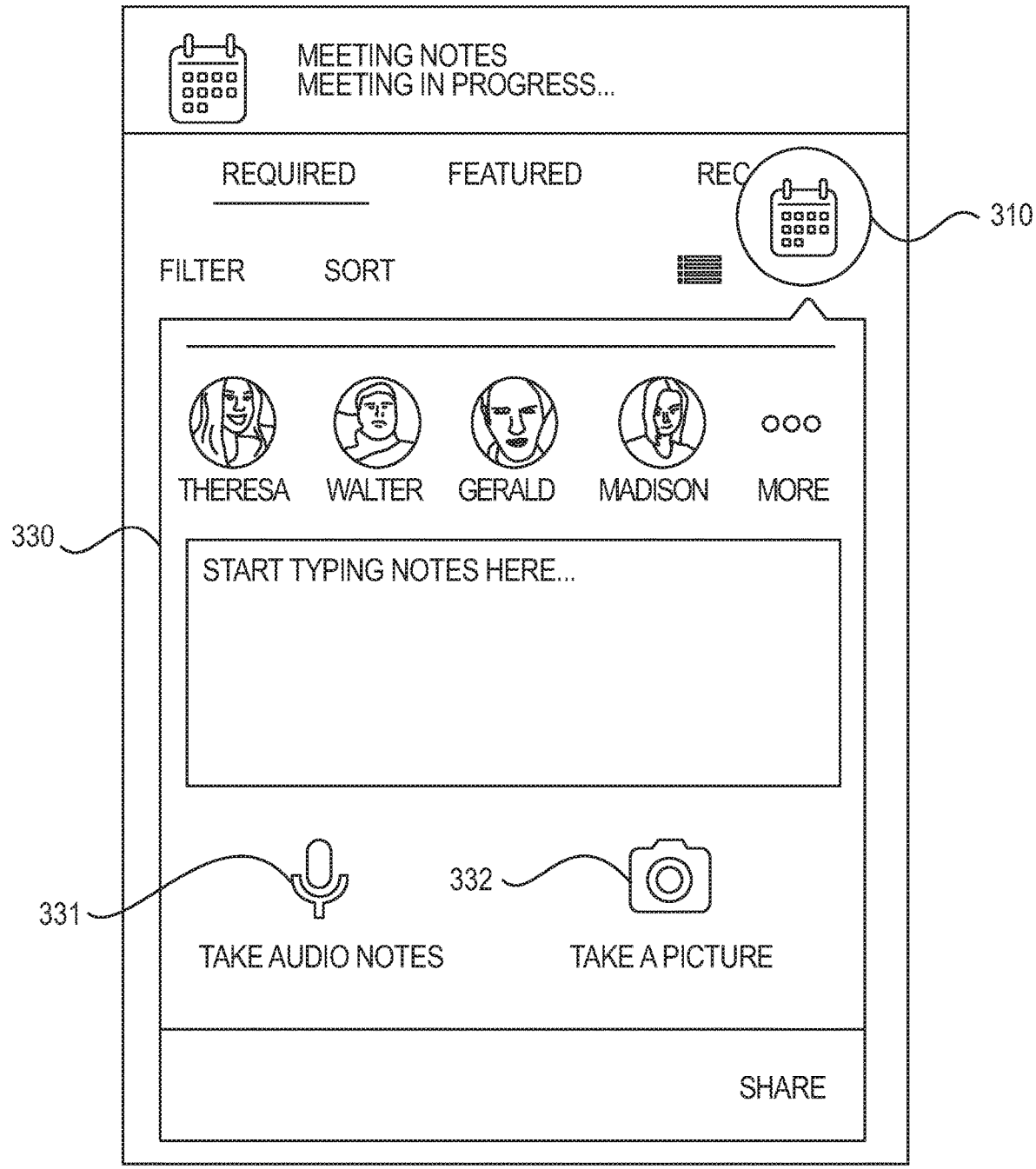
FIG. 3E is an exemplary illustration of a graphical user interface provided by the secure bubble content application.

In another example, selecting the notes option 319 can cause the secure bubble application 120 to launch a notes interface 330, as shown in FIG. 3E. The notes interface 330 can include a region for typing notes. In another example, the notes interface 330 can also include a first option 331 for audio notes and a second option 332 to take a picture or capture video. Therefore, the notes can include text, audio, images, video, or other media.

The secure bubble application 120 can save the notes in association with the calendar event. To save the notes in this manner, the secure bubble application 120 can use the content application 124 in an example. Alternatively, a managed notes application 125 can be used for note creation and storage.

The secure bubble application 120 can also email the notes to one or more of the other participants using the email application 123 after the meeting to provide a summary of the meeting. As shown in FIG. 3E, the notes interface 330 can include an option to share the notes with other participants. This can cause the notes to be emailed to the other meeting attendees in one example.

Figure 3F:
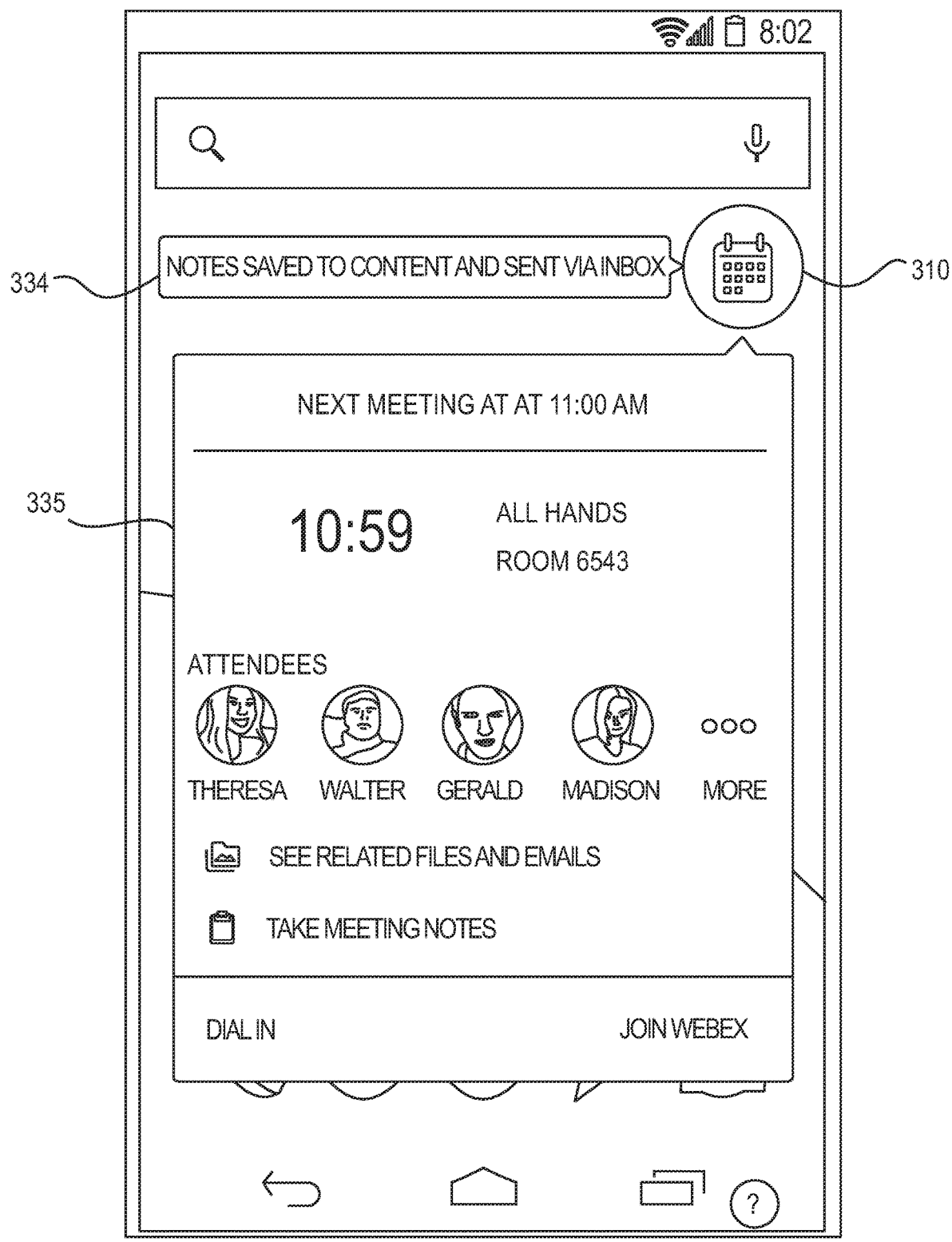
FIG. 3F is an exemplary illustration of a graphical user interface provided by the secure bubble content application.

The secure bubble application 120 can save the notes in a manner that links the notes to future related meetings. For example, if the meeting is reoccurring, then the secure bubble application 120 can include a tag with the notes that identifies the reoccurring meeting or series of meetings. As shown in FIG. 3F, saving the notes can cause the secure bubble application 120 to display a confirmation notification 335 along with a notification of a next meeting for which the notes will be relevant.

The secure bubble application 120 can retrieve the notes for the next related meeting based on the stored tags. In one example, a content search with tag comparisons can execute once the secure bubble application 120 detects that a meeting is set to start within a threshold amount of time. In another example, the user can select a meeting in a calendar pane of a calendar application 121. This can cause the secure bubble application 120 to locate and display the relevant notes and other content items associated with the meeting.

Figure 3H:
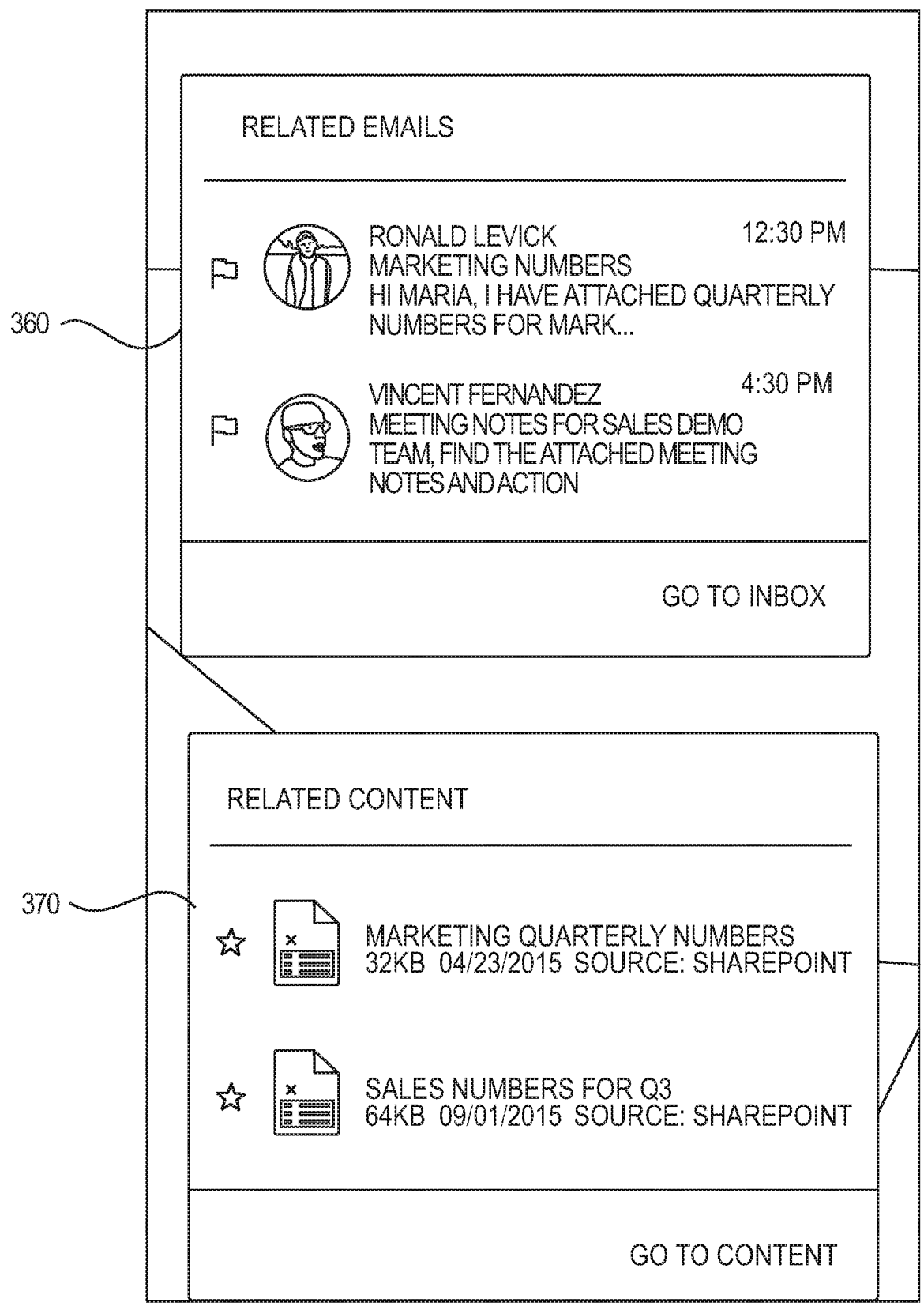
FIG. 3H is an exemplary illustration of a graphical user interface provided by the secure bubble content application.

As shown in FIGS. 3G and 3H, the relevant content for a related meeting can include the notes 350 from the prior meeting. Relevant emails and other content generated since the prior meeting can also be identified and displayed in panes 360 and 370. Separate panes 360 and 370 can be used to separate content item types based on the managed applications 115 from which they were retrieved.

The GUI can also include links to launch the managed applications 115 from which the recommended content items are retrieved. For example, the user can select "GO TO INBOX," and the email application 123 can launch. In one example, the email application 123 can open to a position where one of the recommended emails is in view. This can give the user further context based on other emails in proximity to the recommended email. This feature can also allow the user to quickly retrieve another email that the user knows precedes or is in response to the recommended email. In one example, the user can select a recommended email before selecting the option to go to the inbox. The selected email or the secure bubble application 120 can provide an email identifier that the email application 123 can use to locate the email and open the inbox to a position where the email is in view.

The user can similarly open a content application 124 by selecting "GO TO CONTENT." This can allow the user to, for example, view different versions of a recommended document.

Figure 4:
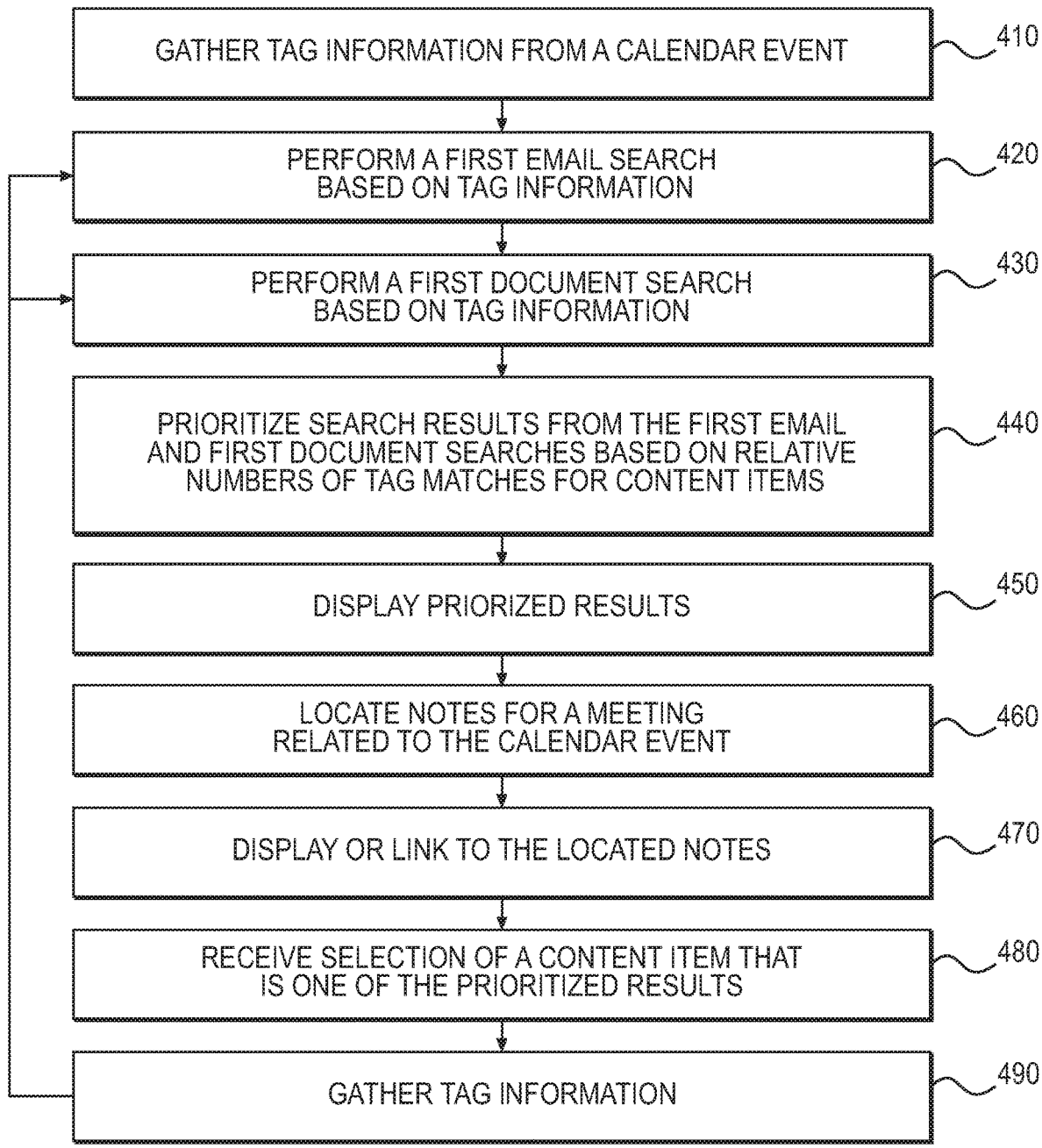
FIG. 4 is an exemplary method executed in a system.

FIG. 4 is an example method for dynamic content recommendation based on a calendar event. The method can be used with the secure bubble application 120. Alternatively, an example method can be used when opening a file from within a separate application, as will be explained with respect to FIG. 5.

At stage 410, the system can gather tag information from a calendar event. This can be performed by the management component 112 in one example. The tag information can identify a meeting or series of meetings. The tag information can also identify attendees and meeting location, including a portion of a uniform resource locator for an online meeting location. The tag information can include dial-in information. The tag information can further include text from the calendar event, such as a meeting title or keywords. The system can retrieve further tag information from any attachments to the calendar event. Example tag information can include creation and edit dates for a file, file title, and content keywords.

At stage 420, the system can automatically perform a first email search based on the tag information. In one example, the managed search application 122 can initiate the email search by supplying the tag information as search criteria to the email application 123. The managed search application 122 can call methods to initiate the search through use of the management component 112 in an example where both the email application 123 and the search application 122 are managed applications 115. The email application 123 can then search for emails that include similar attributes to the tag information. In another example, the management component 112 can utilize an API to cause a non-managed email application to perform an email search. This can include supplying search criteria in a format required by the API.

At stage 430, the system can perform a first document search based on the tag information. Similar to the email search of stage 420, the managed search application 122 can execute the document search by supplying the tag information as search criteria to the content application 124. This can be done through the management component 112 for a managed content application 124. Alternatively, search criteria can be supplied to a non-managed content application with one or more API calls.

The email and document searches of stages 420 and 430 can occur locally on the user device 110 in one example. Managed applications 115 and other applications can maintain metadata locally for identifying files, such as emails and documents, even when the file itself is stored at a server, such as management server 130. In one example, the local metadata includes tag information. The tag information supplied by the managed search application 122 can be compared against the metadata to determine which files contain the most relevant matches. In one example, the managed application 115 responsible for the particular file type can perform the comparison. For example, the email application 123 or content application 124 can compare the tag information to local email or document metadata, rather than performing the search using the managed search application 122. This can prevent having to update the secure bubble application 120 each time a new version of email application 123 or content application 124 would change the searching process. However, in other examples, a search application (whether managed or not) can search the different content sources itself.

The managed search application 122 or secure bubble application 120 can set a cutoff limit for the number of returned search results. The cutoff limit can be based on the number of content items likely to be displayed in a recommended content pane. The cutoff limit can vary based on the screen size being used. For example, a smartphone could display a list including three results, whereas a larger table can display five results at once.

The email and document searches of stages 420 and 430 can occur simultaneously in one example. In another example, the managed search application 122 can wait for the results of one search before performing another.

At stage 440, the system can prioritize the search results based on relative numbers of tag matches for content items. In one example, the individual managed applications 115 that perform the searches can prioritize the results. In another example, the search application 122 or secure bubble application 120 can prioritize. Prioritization can take additional factors into account other than just numbers of tag matches. For example, the system can prioritize email relative to the length of the email. This can help capture a longer thread while leaving a duplicative email from earlier in the thread out of the prioritized results. Similarly, document edit dates or version numbers can be used to initially prioritize the most recent version of a document over prior versions.

At stage 450, the prioritized results are displayed. As shown in FIGS. 3B and 3C, separate panes 314 and 316 can be used to display prioritized results for different types of content items.

In one example, meeting notes can be displayed separately from other document types. They can also be retrieved separately from other types of documents and emails in one example. At stage 460, the secure bubble application 120 can search for related meeting notes. The notes can be stored locally by the secure bubble application 120 in one example. In another example, the managed search application 122 can cause a notes application 125 to search for related notes. A tag, such as a meeting identifier, can be provided as a search input. The notes can be stored with a tag that identifies a set of meetings in one example. By matching the tag information, the located notes can be located and retrieved.

At stage 470, the secure bubble application 120 can automatically display the notes 350, such as is shown in FIG. 3G. In one example, this can allow the user to quickly see the content of the notes without having to locate and open a document for the notes. In another example, the notes can also be audio or visual, as previously explained with respect to FIG. 3E. In that case, a link to the notes can be displayed.

At stage 480, the secure bubble application 120 can receive user selection of a content item from the prioritized results. The selection can indicate that the user believes the content item is relevant, should be kept in the results list, or should be opened. Based on the selection, the secure bubble application 120 can initiate an additional search to modify the prioritized results.

At stage 490, the secure bubble application 120 can gather tag information from the selected content item. The tag information can be used in an additional search. In one example, the additional search is only with respect to the results list to which the selected content items belong. When an email is selected, a second email search can be performed at stage 420. For example, tags indicating the author, recipients, subject, and date of the email, along with tags from an attachment, can be used to perform the additional search for more email with matching tags. Alternatively, when a document is selected, a second document search can be performed at stage 430. The tags from the selected content item can be used to search other content types. For example, tags indicating the authors, edit dates, keywords, and document type, can be used to perform the additional search for more documents with matching tags.

The additional search results can be displayed in an additional card. Alternatively, the additional search results can be used to reprioritize results in an existing card. Additional cards can be ordered in a stack of cards with like content types in one example. This can help the user find a document of a particular content type more easily, and swipe away results or entire cards that are not relevant.

In one example, the displayed results are reprioritized upon completion of the additional search. For example, the secure bubble application 120 can maintain a relevance score for each content item in a results list, including content items that are not yet ranked high enough to be displayed. Additional searches can add new content items to the results, which are reprioritized based on relevance scores. If an additional search for recommended items returns a content item that already exists in the results list, the secure bubble application 120 can increase the relevance score of that content item. If an additional search for eliminated items (explained below) returns a common content item, the relevance score of that content item can be decreased.

Additionally, the secure bubble application 120 can track which content items the user eliminates from the results. Eliminating a content item can cause the next-highest prioritized content item to be displayed. Additionally, when an additional content search is performed, the secure bubble application 120 can remove a previously-eliminated content item or related content items from the search results.

In one example, removed content items can influence the prioritization of additional content items. The secure bubble application 120 can gather tag information from an eliminated content item at stage 490 and cause the managed search application 122 to perform a second search for content items related to the eliminated content item. The search application 122 can compare the results of the second search to recommended content items from a first search, and negatively weight content items that are common to both searches. This can reduce the likelihood that the user is presented with additional content items that the user finds irrelevant.

When a content item is removed, the next highest prioritized result can be added to the bottom of the recommended content list. In one example, the secure bubble application 120 can dynamically update the prioritized list of content items to recommend each time the user selects a content item to view, marks a content item to keep in the list, or removes a content item from the list.

Figure 5:
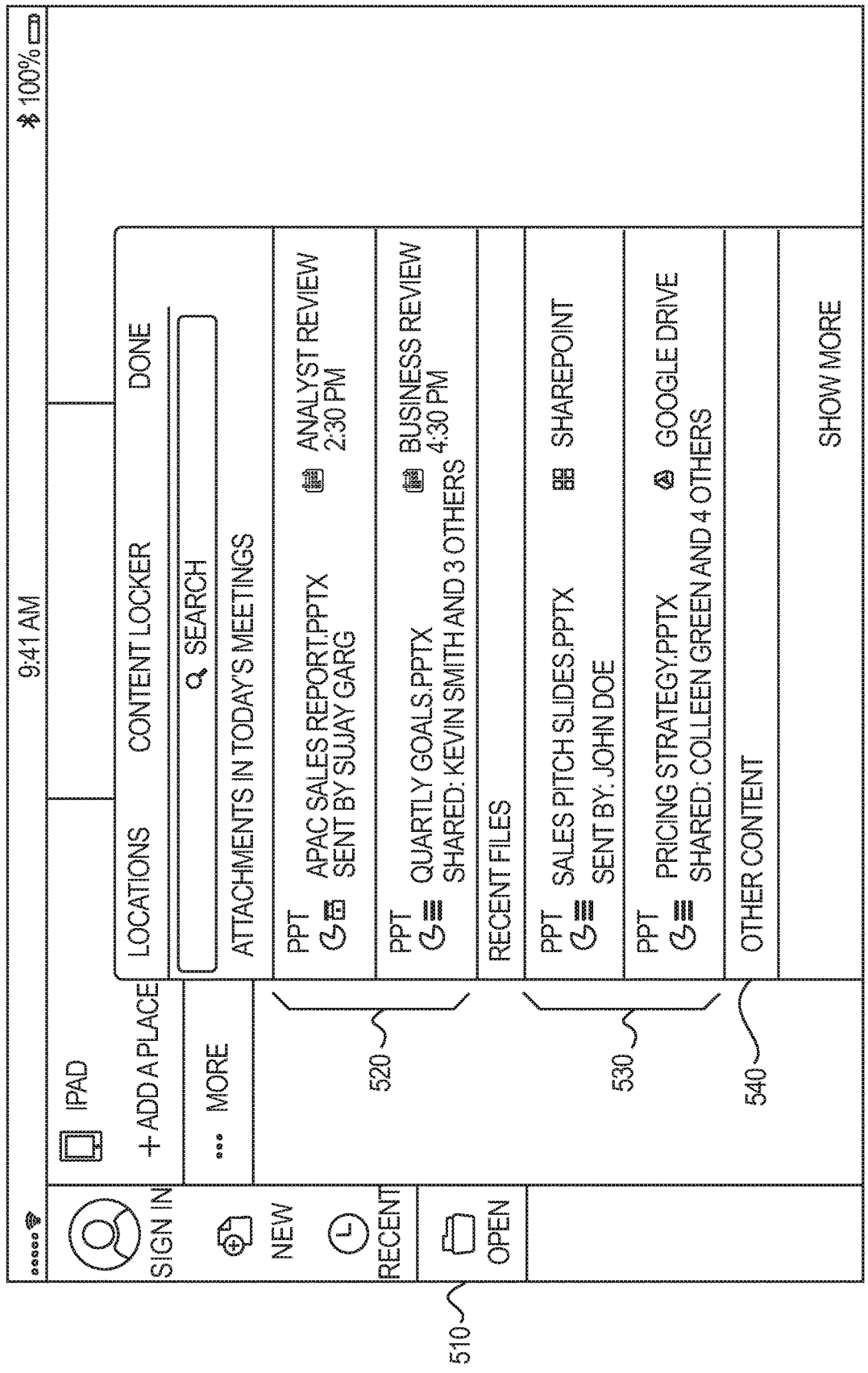
FIG. 5 is an exemplary illustration of a graphical user interface for opening a content item from within an application.

FIG. 5 is an exemplary illustration of a graphical user interface for opening a content item from within an application outside the secure bubble application 120. In this example, the application is POWERPOINT. Other example non-managed applications can include word processors or email clients.

Even though POWERPOINT itself is not a managed application, in one example the user can open a document associated with a managed application 115. For example, when the user selects an option 510 to open a document from within POWERPOINT, a documents pane of potential documents can be displayed.

Instead of displaying only non-managed content items, the management component 112 can execute a search process to recommend managed content based on meeting events. The management component 112 can select the managed application that performs the searching based on the type of document that POWERPOINT can open. For example, the management component can determine that POWERPOINT documents can be stored in the managed content application 124. Consequently, the management component 112 can cause the content application 124 to perform a recommended document search for documents to open within POWERPOINT. This can result in POWERPOINT displaying a list of recommended managed documents that are recommended by the system based on the methods described above.

The management component 112 and content application 124 can populate and prioritize the recommended list based on relevant documents for an upcoming meeting event. The management component 112 can cause the content application 124 to match tags from a meeting event to available content items. Example contextual tags have been discussed above. For example, a tag can indicate that a user authored, modified, sent, or received the document. Based on relative and threshold tag similarities, as described above, the content application 120 can supply an ordered list of relevant content items to the word processing application. The search or results can be tailored to a particular set of document types that can be opened in the non-managed application. In this way, the management component 112 can employ similar recommendation methods of the secure bubble application 120 to other contexts, such as selecting a document to open.

Recommended content can be displayed in a first portion 520 of the document pane. A second portion 530 of the document pane can display recent files. Thus, prioritized results from the management component 112 can be combined with non-managed content recommendations by the non-managed application.

The user can also select an option to see other content 540, which can allow the user to browse for a file. Another option, such as "SHOW MORE," can cause additional prioritized results to be displayed. In one example, if the user selects a content item and then selects "SHOW MORE," an additional search can be performed based on tags in the selected content item. An additional card or pane can display the additional prioritized results.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A system for content recommendation, the system comprising:
    a non-transitory, computer-readable medium that contains instructions;
        a processor that executes the instructions to perform stages for improved content recommendation and display on a graphical user interface, the stages including:
        gathering tags from a calendar event, the tags having been previously applied by a process that applies tags to files having different file types including at least emails, calendar events, and documents, wherein a first tag shared by two files represents a common email thread that both files are part of;
        initiating a first search, including supplying at least the first tag as a first search criteria to an email application for matching against tags previously applied to emails;
        initiating a second search, including supplying at least a second tag of the calendar event as a second search criteria to a content storage application for matching against other tags previously applied to documents;
        displaying a plurality of cards on the graphical user interface, wherein the cards are individual panes in a stack and are individually closeable, wherein at least two of the plurality of cards represent search results for different file types, including:
            a first card including an ordered listing of emails identified in the first email search based on matches with the first tag; and
            a second card including an ordered listing of documents identified in the first document search based on matches with the second tag;
        initiating a third search based on a selection of a content item in the first or second card, the third search using a third tag as a search criteria, the third tag being based on the content item selected; and
        dynamically displaying a third card that includes search results from the third search.

2. The system of claim 1, wherein the third card within the plurality of cards contains a notes file type.

3. The system of claim 1, wherein dynamically displaying the third card includes:
    displaying the search results as a prioritized list;
    receiving a selection to remove a content item from the third card;
    initiating a fourth search based on the removed content item;
    comparing the results of the third and fourth searches;
    lowering the priority of content items common to both search results;
    reordering the displayed search results based on the prioritization.

4. The system of claim 1, the stages further comprising:
launching an application corresponding to the selected content item in response to the selection of the selected content item; and
opening the selected content item in the application.

5. The system of claim 1, the stages further comprising:
receiving a user input to remove the third card; and
removing the third card from the plurality of cards while retaining the first and second cards in the plurality of cards.

6. The system of claim 1, the stages further comprising:
receiving a user selection to remove a content item within the plurality of cards;
removing the content item from the first or second card;
determining an additional content item having a highest priority among content items determined in the first or second search but not yet displayed on the first or second card; and
adding the additional content item to the first or second card.

7. A non-transitory, computer-readable medium containing instructions executed by at least one processor to perform stages for searching and displaying content relevant to a calendar event, the stages comprising:
gathering tags from the calendar event, the tags having been previously applied by a process that applies tags to files having different file types including at least emails, calendar events, and documents, wherein a first tag shared by two files represents a common email thread that both files are part of;
performing a first email search, including supplying at least the first tag as a first search criteria to an email application for matching against tags of emails;
performing a first document search, including supplying at least a second tag of the calendar event as a second search criteria to a content storage application for matching against tags of documents;
prioritizing first returned content items from the first email and first document searches based on relative numbers of tag matches for the first returned content items;
displaying prioritized results, the prioritized results including at least a subset of the prioritized first returned content items, wherein a first pane lists results from the email search and a second pane represents results of the document search, wherein the first and second panes are individual panes in a stack and are individually closeable,
dynamically performing, based on a selection of a first returned content item, an additional tag-based search that returns second returned content items;
displaying a portion of the second returned content items in an ordered listing in a third pane, the third pane being included in the stack and individually closeable, the portion of the second returned content items being displayed having the highest priority;
receiving a selection to remove one of the content items in the third pane; and
adding a next highest prioritized content item to the third pane.

8. The non-transitory, computer-readable medium of claim 7, wherein the stages further comprise displaying a notification based on the calendar event start time.

9. The non-transitory, computer-readable medium of claim 7, wherein the stages further comprise:
receiving a user selection of a first email within the displayed prioritized results in the first pane;
performing a second email search based on tags associated with the first email;
performing a second document search based on tags associated with the first email; and
displaying a content item in the displayed prioritized results based on one of the second email search and second document search.

10. The non-transitory, computer-readable medium of claim 7, wherein the stages further comprise:
receiving a user selection of a non-email document within the displayed prioritized results;
performing a second email search based on tags associated with the non-email document;
performing a second document search based on tags associated with the non-email document; and
displaying an additional content item based on one of the second email search and second document search.

11. The non-transitory, computer-readable medium of claim 7, wherein the stages further comprise:
launching an application corresponding to the first returned content item in response to selection of the first returned content item; and
opening the first returned content item in the application.

12. The non-transitory, computer-readable medium of claim 7, wherein the stages further comprise:
receiving user input to remove at least one of the prioritized results; and
displaying an additional content item in the displayed prioritized results based on the user input.

13. The non-transitory, computer-readable medium of claim 12, wherein the stages further comprise:
performing a second email search based at least in part on the user input to remove the at least one prioritized result;
performing a second document search based at least in part on the user input to remove the at least one prioritized result; and
wherein the additional content item displayed in the prioritized results is returned from one of the second email search or the second document search.

14. The non-transitory, computer-readable medium of claim 7, wherein the stages further comprise:
receiving user input to remove a content item from the prioritized results;
performing a second search based on the removed content item; and
reprioritizing the prioritized results based on the second search.

15. A method for searching and displaying content relevant to a calendar event, comprising:
gathering tags from the calendar event, the tags having been previously applied by a process that applies tags to files having different file types including at least emails, calendar events, and documents, wherein a first tag shared by two files represents a common email thread that both files are part of;
initiating a first email search, including supplying at least the first tag as a first search criteria to an email application for matching against tags of emails;
initiating a first document search, including supplying at least a second tag as a second search criteria to a content storage application for matching against tags of documents;
displaying a plurality of cards, wherein the plurality of cards are individual panes in a stack and are individually closeable, wherein at least two of the plurality of cards represent searches for different file types, including:
- a first card including an ordered listing of emails identified in the first email search based on matches with the first tag; and
- a second card including an ordered listing of documents identified in the first document search based on matches with the second tag;

receiving a selection to remove a content item from one of the first or second card;

initiating a third search based on the removed content item;

comparing the results of the third search with the results of the first and second searches;

lowering the priority of content items common to search results; and reordering the displayed search results based on the prioritization.

16. The method of claim 15, wherein the third card within the plurality of cards contains search results for a notes file type.

17. The method of claim 15, further comprising dynamically displaying a third card that includes search results from the third search.

18. The system of claim 15, the stages further comprising:
receiving a selection of a content item from one of the first or second card;
launching an application corresponding to the selected content item in response to the selection of the selected content item; and
opening the selected content item in the application.

19. The system of claim 18, the stages further comprising:
receiving a user input to remove the third card; and
removing the third card from the plurality of cards while retaining the first and second cards in the plurality of cards.

20. The system of claim 15, the stages further comprising:
receiving a user selection to remove a content item within the plurality of cards;
removing the content item from the first or second card;
determining an additional content item having a highest priority among content items determined in the first or second search but not yet displayed on the first or second card; and
adding the additional content item to the first or second card.

* * * * *